United States Patent
Ding et al.

(10) Patent No.: US 11,212,245 B1
(45) Date of Patent: Dec. 28, 2021

(54) DETECTION OF FORGED E-MAIL MESSAGES AT E-MAIL GATEWAY

(71) Applicants: Ritchied Ding, Nanjing (CN); Rocky Qu, Nanjing (CN); Robert Yang, Nanjing (CN)

(72) Inventors: Ritchied Ding, Nanjing (CN); Rocky Qu, Nanjing (CN); Robert Yang, Nanjing (CN)

(73) Assignee: TREND MICRO INC., Tokyo (JP)

( * ) Notice: Subject to any disclaimer, the term of this patent is extended or adjusted under 35 U.S.C. 154(b) by 45 days.

(21) Appl. No.: 16/597,609

(22) Filed: Oct. 9, 2019

(51) Int. Cl.
| | |
|---|---|
| *G06F 15/16* | (2006.01) |
| *H04L 12/58* | (2006.01) |
| *G06Q 10/10* | (2012.01) |
| *H04L 29/06* | (2006.01) |
| *G06F 40/30* | (2020.01) |

(52) U.S. Cl.
CPC ............. *H04L 51/12* (2013.01); *G06F 40/30* (2020.01); *G06Q 10/107* (2013.01); *H04L 51/066* (2013.01); *H04L 51/22* (2013.01); *H04L 51/34* (2013.01); *H04L 63/126* (2013.01)

(58) Field of Classification Search
CPC ....... H04L 52/12; H04L 51/066; H04L 51/22; H04L 51/34; H04L 63/126; G06F 40/30; G06Q 10/107

USPC .......................................................... 709/206
See application file for complete search history.

(56) References Cited

U.S. PATENT DOCUMENTS

| | | | | |
|---|---|---|---|---|
| 8,166,118 | B1 * | 4/2012 | Borghetti | H04L 51/12 709/206 |
| 2012/0236348 | A1 * | 9/2012 | Ochi | G06Q 10/107 358/1.13 |
| 2018/0091453 | A1 * | 3/2018 | Jakobsson | H04L 51/12 |
| 2018/0152471 | A1 * | 5/2018 | Jakobsson | H04L 63/1433 |
| 2018/0295153 | A1 * | 10/2018 | Eisen | H04L 63/1483 |
| 2019/0260713 | A1 * | 8/2019 | Jakobsson | H04L 63/0254 |

* cited by examiner

*Primary Examiner* — Alan S Chou
(74) *Attorney, Agent, or Firm* — Beyer Law Group LLP

(57) ABSTRACT

An e-mail message is sent from a public e-mail address via the e-mail account of a user and delivered to an e-mail gateway. The message is destined for the e-mail account of a recipient. The gateway determines that the public e-mail address is on a list of users desiring two-factor authentication. The gateway determines that the message contains an anomaly indicating fraud or possible forgery. The gateway sends a two-factor authentication message to a hidden e-mail account of the user. The user reviews the message and responds with a confirmation message either confirming that the message is legitimate or indicating that it is a forgery. If the message is legitimate the gateway allows the message to be delivered to the recipient; if not, the message remains in quarantine and is not delivered. The gateway exists at the user's corporation, the recipient's corporation or is hosted at a third-party cloud service.

20 Claims, 9 Drawing Sheets

Forged E-Mail Message Detection System

Forged E-Mail
Message Detection System

Forged E-Mail Message Detection System

2FA for the "Pay the e-mail gateway license" message
2FAE-MailGateway@test.com ~504
Mon 9/16/2019 11:58 AM
To: Ritchied <Ritchied>; Ding <Ding> ~508

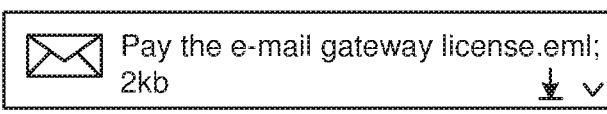 512

Pay the e-mail gateway license.eml; 2kb

Dear Ritchied:

On Sept. 16, 2019 the 2FA e-mail gateway system received an e-mail message apparently from you that seems abnormal. Would you please review the message? The message is attached.    516

If the message has really been sent from you please click: http://2FA/release/123 (in order to release the message to the recipient), otherwise click: http://2FA/quarantine/123 (in which case the message will be placed in quarantine and not sent). 520

Thank you.

2FA E-mail Gateway System

Alert Message to Private E-Mail Address

Pay the e-mail gateway license
Ritchied_ding@test.com <dzc@test.com> ~538
Mon 9/16/2019 3:51 PM
To: Rocky; Qu ~542

Hi Rocky,

This e-mail gateway is good.
I have agreed to buy this e-mail gateway, please pay for this.
You can contact robert_yang@test.com for details.

_____
Ritchied_ding@test.com

512

Original Message to Recipient

DETECTION OF FORGED E-MAIL MESSAGES AT E-MAIL GATEWAY

FIELD OF THE INVENTION

The present invention relates generally to detection of forged e-mail messages. More specifically, the present invention relates to rule-based detection of forged e-mail messages at an e-mail gateway before the message is delivered.

BACKGROUND OF THE INVENTION

Detecting a forged e-mail message is a constant struggle. E-mail spoofing and outright password theft are two techniques used to forge e-mail messages. Any user can be the victim of an attack using a forged e-mail message.

E-mail spoofing is the creation and sending of e-mail messages with a forged sender address, not originating from the true sender's e-mail account. so that the message appears to have originated from someone or somewhere other than the actual source. E-mail spoofing is a popular tactic used in phishing and spam campaigns because people are more likely to open a message when they think it has been sent by a legitimate or familiar source. The goal of e-mail spoofing is to get recipients to open, and possibly even respond to, a solicitation. E-mail spoofing can be easily achieved with a working Simple Mail Transfer Protocol (SMTP) server and mailing software like Outlook or Gmail. Once an e-mail message is composed, the scammer can forge fields found within the message header such as the FROM, REPLY-TO and RETURN-PATH addresses. After the e-mail is sent, it will appear in the recipient's mailbox that appears to come from the address that was entered.

Even worse, a hacker may actually steal the user name and password, and then, with access to the user's e-mail account, send a forged e-mail message. In other words, the e-mail message is actually coming from the user's account but was not written by the user—it is a forged e-mail message.

A variety of technologies are used to detect forged e-mail messages but each has its limitations. By way of example, Sender Policy Framework (SPF), Domain Keys Identified Mail (DKIM), and Domain Message Authentication Reporting (DMARC) are widely used to protect against an attacker spoofing an e-mail message (by forging the sender e-mail address when sending e-mail), but, these three technologies cannot protect against outright password theft (when the attacker steals the user's e-mail password and then sends a forged message from the user's true e-mail account).

Two-factor authentication (2FA) may be used when a user logs in to his or her e-mail account; this can protect customer accounts but also has some weaknesses. For instance, 2FA can be burdensome, especially when the customer only sends very few messages with any sensitive data, using 2FA in this situation is not user friendly. Also, it is not possible to choose 2FA based upon the message content.

In addition, requiring that a user log in using 2FA is obvious to any potential attacker; using 2FA protects a customer's e-mail account but also tells an attacker that this account needs 2FA. The attacker is then made aware that he must not only steal the account password but also needs to steal the 2FA tool (such as a passcode tool or other 2FA tool being used). It is best not to provide an attacker with too much information.

Using a detection engine or a pattern is not workable because a forged e-mail message has no special code or unique behavior to detect. Further, sending a forged message from the user's real e-mail account is extremely hard to detect using a pattern or by any business e-mail compromise (BEC) software.

Therefore, in view of deficiencies in the prior art in detecting forged e-mail messages coming from a legitimate user account, it is desirable to be better able to detect forged e-mail messages and to increase the detection rate.

SUMMARY OF THE INVENTION

To achieve the foregoing, and in accordance with the purpose of the present invention, a system is disclosed that detects forged e-mail messages using two-factor authentication and lowers the burden on the sender.

Further, use of 2FA is not known to the attacker. Thus, instead of alerting the attacker that an e-mail account requires 2FA, the attacker is ignorant that a security technique like 2FA is being used; thus, the attacker will send forged e-mail messages thinking that they do not need 2FA and that the forged e-mail was sent successfully when in actuality it was not. The present invention does not require 2FA when the user logs in to his or her public e-mail account. Checking for anomalies is done by the gateway when necessary, which may ask the user to verify that he or she did send a particular message—a form of 2FA.

An e-mail message is sent from a public e-mail address via the e-mail account of a user and delivered to an e-mail gateway. The message may be sent by the user or by an attacker who has forged the message. The message is destined for the e-mail account of a recipient. The gateway determines that the public e-mail address is on a list of users desiring two-factor authentication. If not, then the message is delivered. The gateway determines that the message contains an anomaly indicating fraud or possible forgery, in which case the message is placed in quarantine. The gateway sends a two-factor authentication message to a hidden e-mail account of the user. The hidden account is only used by the user to communicate with the e-mail gateway. The gateway sends the original message and selectable links by which the user by deliver the message or delete it and not have it delivered. The user reviews the message and responds with a confirmation message either confirming that the message is legitimate or indicating that it is a forgery. If the message is legitimate the gateway allows the message to be delivered to the recipient; if not, the message remains in quarantine and is not delivered. The gateway may exist at the user's corporation, the recipient's corporation or may be hosted at a third-party cloud service.

BRIEF DESCRIPTION OF THE DRAWINGS

The invention, together with further advantages thereof, may best be understood by reference to the following description taken in conjunction with the accompanying drawings in which:

FIG. 5A is an example of the alert message sent fro the gateway to the legitimate user using the private e-mail address.

DETAILED DESCRIPTION OF THE INVENTION

Figure 1:
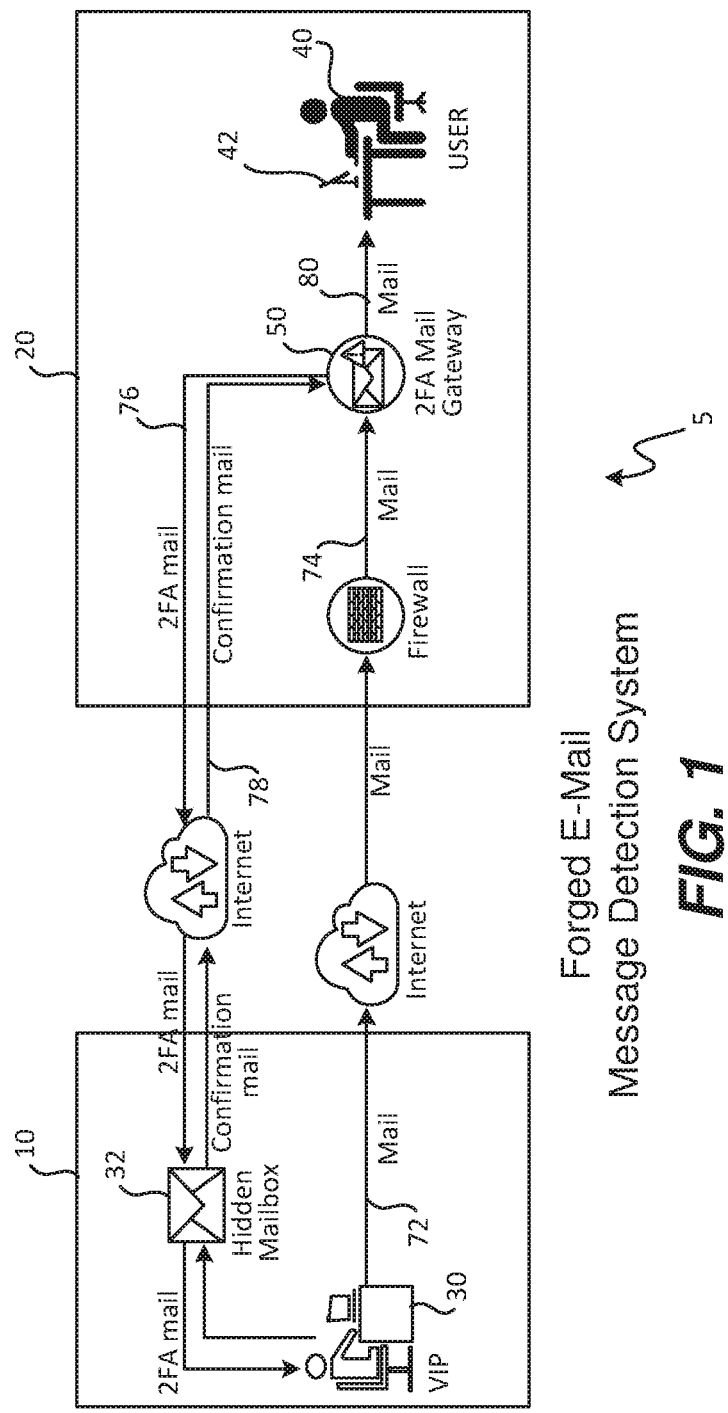
FIG. 1 illustrates a first embodiment of a forged e-mail message detection system.

FIG. 1 illustrates a first embodiment of a forged e-mail message detection system 5. In this embodiment, the 2FA e-mail gateway 50 is found within the corporate environment 20. Shown is a VIP user 30 within a corporate environment 10 and a recipient user 40 within the corporate environment 20. Not shown for clarity is an e-mail gateway and firewall of corporate environment 10.

As will be explained in greater detail below, in this example, user 30 sends an e-mail message 72 via his or her public e-mail account which is received as message 74 within corporation 20 and delivered to the 2FA e-mail gateway 50. The message is destined for the e-mail account of user 40 who is using a computer 42 to access that account. The gateway sends a two-factor authentication message 76 to a hidden e-mail account 32 of the user 30. User 30 responds with a confirmation message 78 either confirming that the message 72 is legitimate or indicating it is a forgery. In this example, message 72 is legitimate and gateway 50 allows the message 80 to be delivered to user 40.

Figure 2:
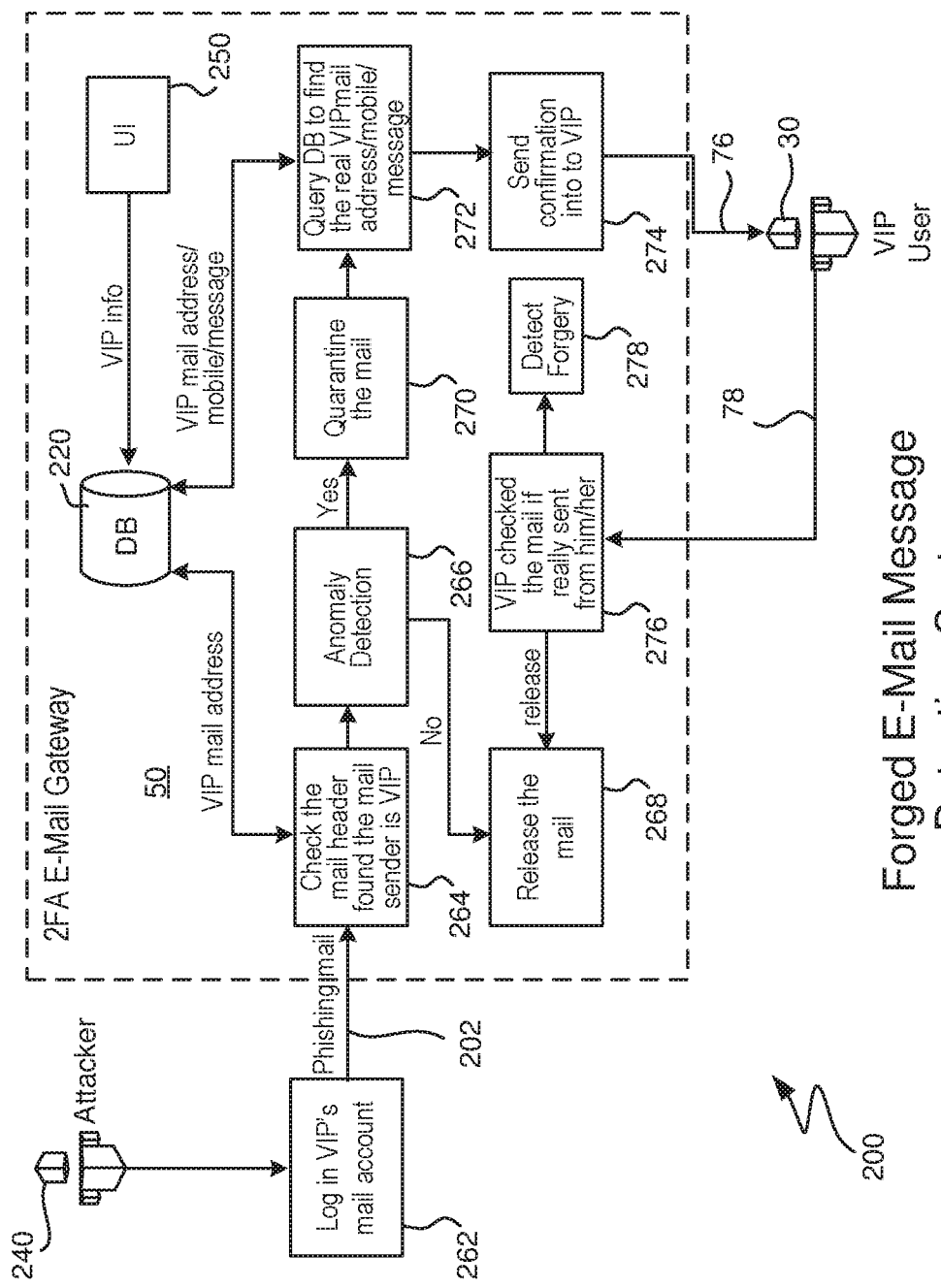
FIG. 2 illustrates in greater detail detection system and specifically the 2FA e-mail gateway.

FIG. 2 illustrates in greater detail detection system 200 and specifically the 2FA e-mail gateway 50. In this example, an attacker 240 has stolen the credentials for a VIP user's public e-mail account and has logged into that account 262 in order to send a forged e-mail message, such as a phishing message 202, to a recipient.

Shown in greater detail is the 2FA e-mail gateway 50. As is known in the art, a traditional e-mail gateway is present within a corporate environment to manage incoming and outgoing e-mail messages on behalf of the corporate users. Such an e-mail gateway is typically implemented as a software application executing upon a suitable host computer, and may also be implemented as a standalone, dedicated hardware appliance that includes software for implementing the functions of the gateway. As shown in FIG. 1, the 2FA e-mail gateway 50 of the present invention may be implemented upon an e-mail gateway within corporation 20 (in order to protect its users) and may also be implemented upon an e-mail gateway within corporation 10 (in order to detect and quarantine forged e-mail messages before they leave corporation 10). As will be discussed in FIG. 6, the 2FA e-mail gateway 50 of the present invention may also be implemented upon an e-mail gateway located at a cloud service accessible via an Internet connection. Thus, a traditional e-mail gateway may be modified as illustrated and discussed herein to provide the advantages discussed herein.

Following is an overview of the operation of gateway 50 and further details will be provided in the following figures. Using a suitable user interface 250 on a suitable computer, user 30, a system administrator, or other, enters the VIP user information into database 220 which will include not only the public e-mail address of the VIP user, but also his or her hidden e-mail address. Both of these are stored in association with one another so that either may be retrieved when presented with the other.

Typically, a user has a public e-mail address that he or she makes available to the public and by which the user not only sends messages to other people but also receives messages from others using that public address. This public e-mail address may also be termed the user's public e-mail account and may be implemented via e-mail server software that a corporation hosts itself on premises or may be implemented using a cloud service.

By contrast, the present invention proposes that the VIP user (and others) will also have a private e-mail address (or hidden e-mail address) that is not known to the public. In other words, this private e-mail address (or private e-mail account) is not disclosed to the public, the user does not use it to send e-mail messages to other people, and the existence of this private e-mail address and it's credentials are known only to the 2FA e-mail gateway 50 (and perhaps the administrator who enters the information) and the user himself or herself. Accordingly, the VIP does not use the private address to send messages to others, only to respond to messages from the 2FA e-mail gateway. And, the VIP would never receive messages from others at this private e-mail account because it is not known to the outside world. In this manner, any attacker will never have access to that private e-mail account and will be unable to forge a message using that account. Advantageously, because two-factor authentication using that hidden account is unknown to any attacker, the attacker is not motivated to determine its existence and try to steal its credentials. In one example, an individual has a public, or official, e-mail address "eva_chen@trendmicro.com", but also has a hidden address which may be "eva_hidden@gmail.com".

In a variation, instead of the VIP user having a private e-mail account, the user may have a private mobile telephone number or private messaging account either of which are also unknown to the public. Examples of messaging accounts are a Facebook account, a WEChat account, etc. In this manner, the two-factor identification as described below will send a text message to the user's private mobile telephone number or private messaging account, again, to avoid detection by any attacker. In order select "release" or "quarantine" if a mobile number or a messaging address are used, the VIP user receives an SMS message at the mobile number or messaging address. In the SMS message there are two hyperlinks; one link is for "release" (i.e., when selected the original message 202 is released to the recipient), and the other link is for "quarantine" (i.e., when selected the original message 202 is placed into quarantine and not delivered).

Whether a private e-mail address is used or mobile telephone number or messaging address, this hidden information is stored within database 220 in association with the user's public e-mail address for later reference.

When e-mail message 202 arrives, block 264 checks whether the sender of that message (based upon the e-mail header, for example) is a person found within database 220 (by comparing to the user public address). The reason for this check is that not every user in an organization may be using two-factor authentication. Those users that are will have put their information into database 220 as discussed above. If so, then block 266 performs anomaly detection (as explained below) in order to determine if it is likely that message 202 has been forged.

If not, then block 268 releases message 202 to be delivered to the user 40. On the other hand, if it is determined that message 202 has likely been forged, then block 270 quarantines the message within the e-mail gateway until two-factor authentication can be performed.

Accordingly, block 272 queries database 220 (using the sender's public e-mail address) to retrieve the corresponding private or hidden e-mail address of that sender. As mentioned above, instead of retrieving a corresponding hidden e-mail address, database 220 may return a private mobile telephone number or private messaging address. Using a returned private e-mail address, block 274 sends information to the actual owner of the e-mail account in order to perform two-factor authentication. Once user 30 receives the request to confirm or deny whether the message 202 is legitimate, he or she is provided with options for the releasing or quarantining the message 20:2. In this example, since message 202 has been forged, in block 276 the user selects an option indicating that forgery has been detected 278 and the message will not be delivered to the user. On the other hand, if the user determines that message 202 was in fact legitimate, he may choose a selection to release the message to the recipient user 40 as shown in block 268.

Flow Diagrams

Figure 3:
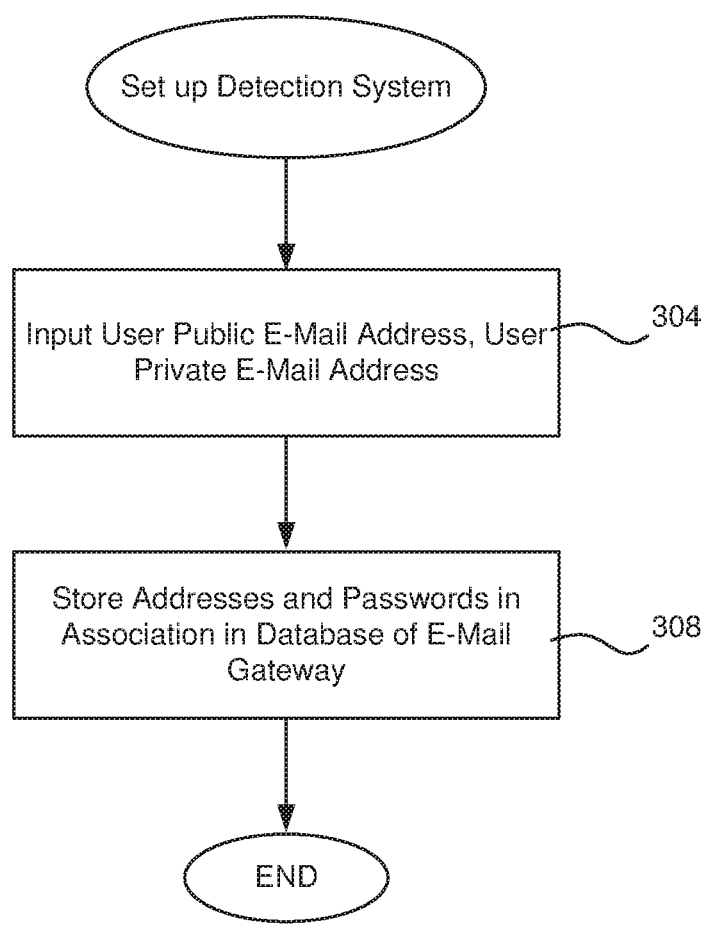
FIG. 3 is a flow diagram describing how the detection system may be set up.

FIG. 3 is a flow diagram describing how the detection system may be set up. In a first step 304 an administrator (or other) inputs a user public e-mail address in association with a private or hidden e-mail address of that user. Any number of pairs of these e-mail addresses for any number of users may be input. These pairs of addresses represent those individuals who wish to use two-factor identification to indicate that e-mail messages that are sent by them are legitimate or that e-mail messages that appear to have been sent by them (but were not) have been forged and should be detected and deleted.

These individuals may be restricted to users within a particular corporation, may be directed to users of a particular e-mail messaging platform or service, or may be an unrestricted list of any and all individuals who wish to participate in two-factor authentication. By providing an unlimited list, the detection system is better able to protect more recipients of e-mail messages.

In the next step 308, these pairs of e-mail addresses are stored together in association in database 220 of the 2FA e-mail gateway 50. Or, as mentioned above, instead of using a private e-mail address for a particular person, that person may choose to provide a private mobile telephone number or private messaging address. In fact, there may be some users who provide private e-mail addresses, others that provide private mobile telephone numbers, and others that provide private messaging addresses, all within the same database. Once this information has been stored within the database, the gateway 50 is ready to detect possible e-mail forgeries.

Figure 4A:
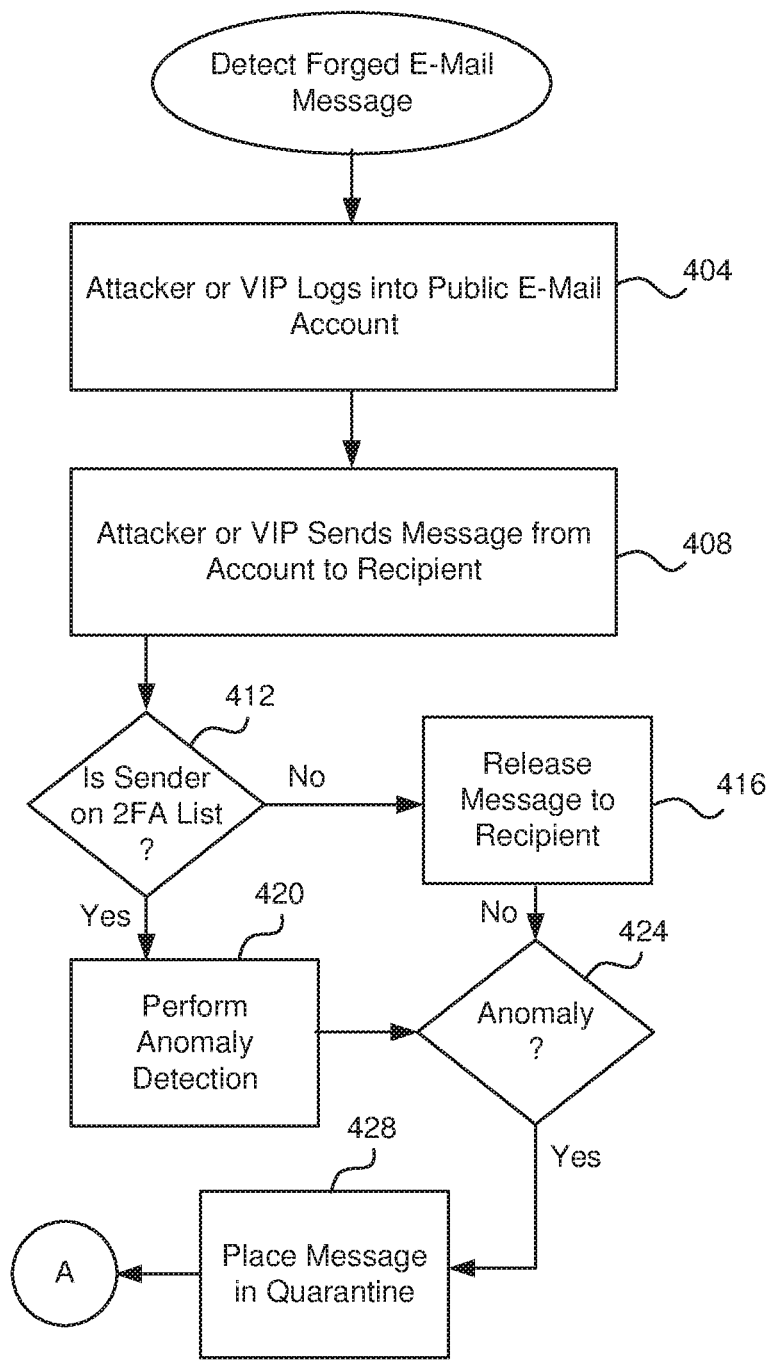
FIGS. 4A and 4B are a flow diagram describing one embodiment by which the detection system detects whether or not an e-mail message has been forged or not.
Figure 4B:
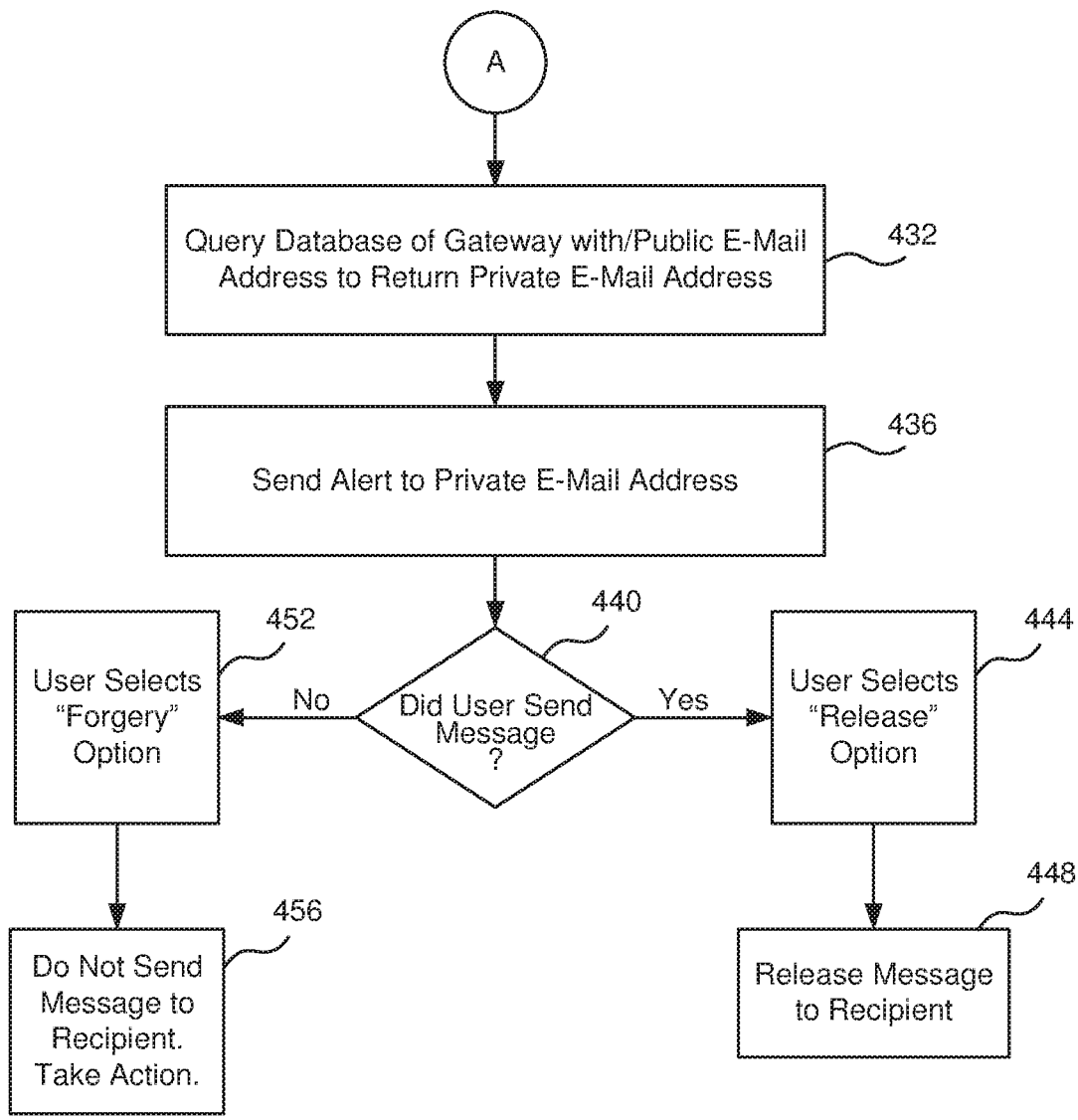

FIGS. 4A and 4B are a flow diagram describing one embodiment by which the detection system detects whether or not an e-mail message has been forged or not. In a first step 404 it is possible that an attacker logs into the public e-mail account of the VIP user after stealing the credentials, or perhaps the user himself logs into his or her own public account using his or her public e-mail address. In step 408 the attacker or the user sends an e-mail message from the user's public e-mail account to a recipient. If it is the attacker, the sent e-mail message is by definition a forged message since it did not originate with the actual user. If the message was sent by the actual user then it is a legitimate message.

Referring now to FIG. 1, this message 74 now arrives at the 2FA e-mail gateway 50 implemented within the e-mail gateway of corporation 20. At this point though, the message has not been delivered to the recipient.

In a next step 412 the system determines whether or not the sender account of the e-mail message (i.e., the public e-mail address) is on the list of those individuals who participate in two-factor authentication. This determination is made by passing the public e-mail address (for example, by retrieving it from the message header) and checking database 220 to determine if that public e-mail address is present within the database. If not, this means that the owner of the public e-mail address is not participating in two-factor authentication and control move to step 416 in which case the message 80 is released to the recipient 40. If the sender is on the list (because the address is present in the database), then in step 420 the detection system performs anomaly detection to determine if there is some anomaly in the message indicating that the message might not have been sent by the legitimate owner of the account.

Anomaly detection may be performed in many different manners. Generally, it may be possible to not perform any anomaly detection and to simply send an alert to the user via two-factor authentication based upon every message that is sent from the user's public e-mail account, but this would overwhelm the user with too many messages and he or she would suffer from "alert fatigue." Accordingly, different techniques are used to detect an anomaly and only if one is detected is the alert sent to the hidden e-mail address of the user.

By way of example, anomalies may be detected based upon the message content, the message structure and other characteristics of the message. Concerning the message content, searching or matching text in the message (using a regular expression search pattern, for example) may be used to identify sensitive words such as "money," "account," "password," etc. If a sensitive word or phrase is detected in the message, this may indicate that a forged e-mail message has been sent and the attacker is trying to steal money, credentials, etc.

Or, the writing style in the message may be analyzed to determine if it looks odd, is not similar to the user's normal writing style, or is similar to the style of other forged messages. This analysis of writing style may be done by using machine learning or artificial intelligence. Normal e-mail messages from the VIP user are used to training a model, and then the potentially forged message is fed into that model in order to detect if the writing style of that message is different from the normal writing style.

The structure of the message may also be analyzed to determine if an anomaly is present. For instance, a large number of attachments may indicate an anomaly, the URL may indicate an anomaly, or even the naming style used for an attachment may indicate an anomaly. Too many attachments may indicate a forged message, or an attachment named in a style used by attackers can also be suspect. And, a URL may be an anomaly if the domain of the URL from which the message is sent has never appeared before in e-mail messages from that VIP user.

Other characteristics of the message may also be analyzed. For instance, if the legitimate user typically is sending messages at particular times, but the current message is sent at an abnormal time, this may indicate an anomaly. The system keeps track of these times by tracking the times when the VIP user normally sends e-mail messages, and may calculate a norm, average, mean, mode, range, bell curve, or other representation of the times when messages are sent. This value is then stored in a system database (e.g. database 220). Then, the time of the suspect message is compared to this database using a threshold, standard deviation, range, etc. If the time of the suspect message is out of the threshold, standard deviation, range, etc., this indicates an abnormal time.

Or, the location of the sending computer may indicate an anomaly. For instance, if the legitimate user typically send messages from a particular geographic locations, but the current message is from a different location or from a location quite distant from the previous locations, this may indicate that an anomaly is present. This analysis of the geographic location of the computer used to send an e-mail message may be analyzed by using IP addresses.

For example, the system keeps track of these locations from which normal messages are sent from the VIP user by using the IP address of the e-mail header, and may calculate a norm, average, mean, mode, range, bell curve, geographic area, circular area, or other representation of the locations from which the messages are sent. These data values are then stored in a system database (e.g. database 220). Then, the location of the suspect message is determined from the IP address of the message header and this location is compared to the stored data values in the database using a threshold, standard deviation, range, maximum distance, etc. If the location of the sending computer of the suspect message is out of the threshold, standard deviation, range, maximum distance, etc., this indicates an anomaly.

If an anomaly is not detected in step 4:24 then control moves to step 416 as discussed above and the message is released to the recipient. By contrast, if an anomaly is detected in step 424, then control moves to step 428 and the message is placed in quarantine by the e-mail gateway and it is not delivered at this time to the recipient.

Next, in step 433 the detection system queries database 220 using the public e-mail address of the current message in order to retrieve the associated private e-mail address. As mentioned before, this private e-mail address (or perhaps the private telephone number or private messaging address) is known only to the 2FA e-mail gateway 50 and the legitimate user. Once retrieved, in step 436 an alert is sent to the legitimate user using this private e-mail address from the 2FA e-mail gateway.

Example Alerts

FIG. 5A is an example of the alert message 500 sent in step 436 from gateway 50 to the legitimate user using the private e-mail address. Shown is the sender address 504, the legitimate user private address 508, and attachment 512 which is the suspect message which may or may not be from an attacker, and options 516 and 520 in the body of the message.

Figure 5B:
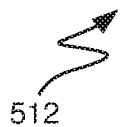
FIG. 5B shows the original suspect message which was sent from the public e-mail address of the user to the recipient.

FIG. 5B shows the original suspect message 512 which was sent from the public e-mail address of the user to the recipient. As shown, this message includes the public e-mail address 538 of the user, the recipient address 542 and the body of the message. In this example the message includes a suspect phrase such as "please pay for this."

In step 440 the legitimate user has logged into his private e-mail account (using his private e-mail address and associated password) and views alert message 500 from 2FA gateway 50. The user clicks on attachment 512 and views message 512 showing the original message that was sent. In step 440 the user determines whether or not he or she has sent the original message 512. If so, then in step 444 the user selects the "release" option at 516 in the alert message and in response to that selection, the 2FA gateway 50 in step 448 releases the original message 80 to the recipient 40. The gateway receives the selection 516 using the URL of the link. For example, the URL includes the domain of the e-mail gateway and uses a random identifier and signature to perform the authentication. For example, link 516 may be: "http://domainof2FAgateway/123123abcdffa/123456." In this example, "123123abcdffa" is the path to authenticate if the message is legitimate, and "123456" is the mail identifier of this message.

If the user determines that he or she did not send the original message after viewing message 512, then in step 452 these user selects the "quarantine" option 520 in the alert message indicating that the original message was a forgery, and then in step 456 the original message is not sent to the recipient and the detection system takes other actions. Link 520 may be implemented as per link 516, except it indicates a forgery. In an alternate embodiment, the original message (which has been determined by the VIP user to be a forgery) is delivered to the recipient with a warning that it is a forged message. Other actions that the detection system may take at this point include deleting the suspect message immediately and permanently.

As mentioned earlier, the 2FA e-mail gateway may also be implemented upon an e-mail gateway located remotely from either the sender or recipient corporation, such as being located as part of a cloud e-mail service.

Figure 6:
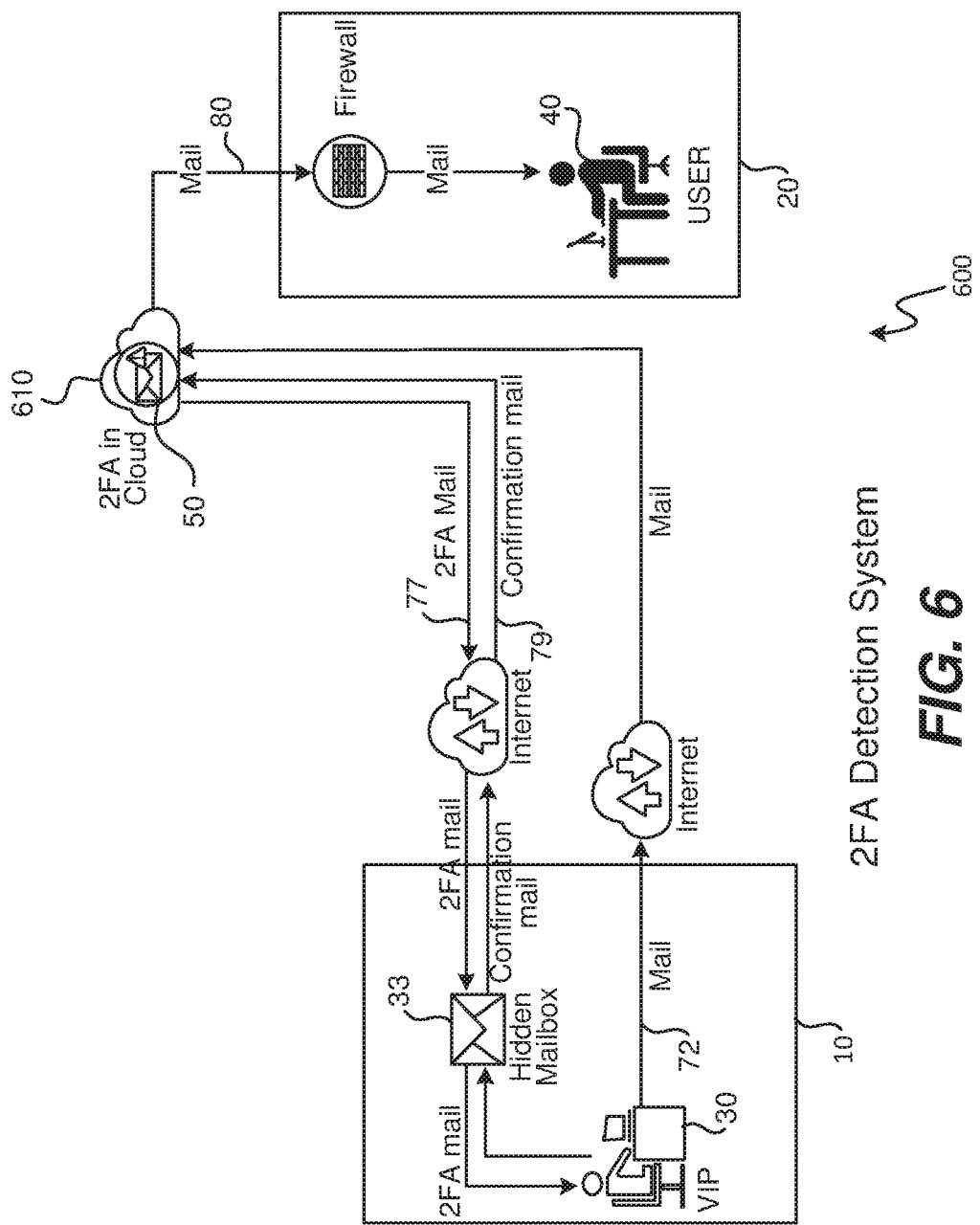
FIG. 6 illustrates a detection system in which the 2FA e-mail gateway located within a cloud e-mail service.

FIG. 6 illustrates a detection system 600 in which 2FA e-mail gateway 50 is located within a cloud e-mail service 610. In this example, VIP user 30 sends original message 72 which is routed to cloud e-mail service 610. The 2FA e-mail gateway 50 checks for anomalies, and assuming one is found, sends an alert message 77 to the hidden e-mail address of the user's hidden account 33. The user then views this message as discussed above, and may click upon the "release" selection of the alert message or the "quarantine" selection of the alert message in order to stand send a confirmation message 79 back to gateway 50 within cloud service 610. Based upon the selection, and in this example, the message appears legitimate and the original message is released to user 40. If the original message had been deemed a forgery by the user, then cloud e-mail service 610 would not have released the original message to the user.

Computer System Embodiment

Figure 7A:
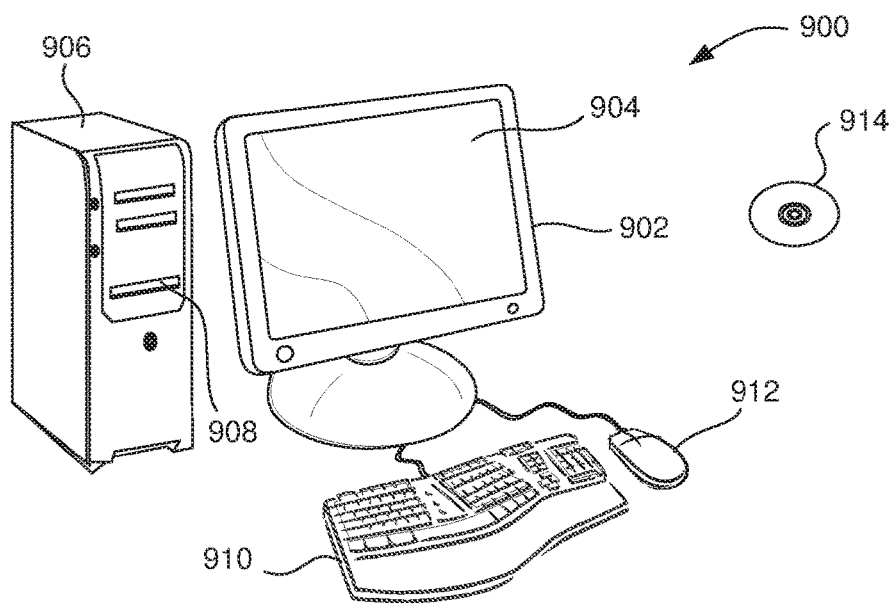
FIGS. 7A and 7B illustrate a computer system suitable for implementing embodiments of the present invention.
Figure 7B:
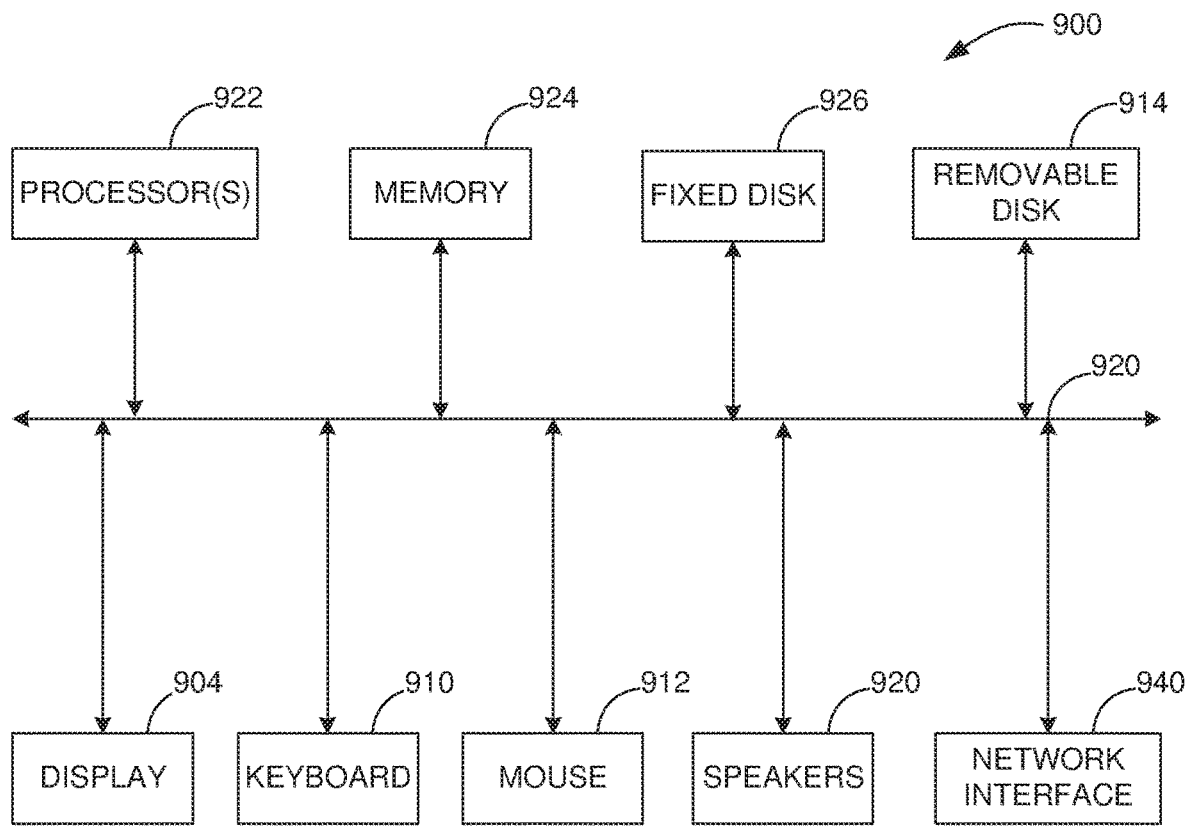

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922;

it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting a forged e-mail message, said method comprising:
   receiving, at an e-mail gateway within an enterprise, an e-mail message from a sender e-mail account having a sender e-mail address, said sender e-mail account belonging to an individual;
   detecting that said e-mail message has an anomaly indicative of fraud;
   retrieving a private e-mail address of said individual from a database using said sender e-mail address, wherein said private e-mail address is a hidden e-mail address not known to the public;
   sending said e-mail message to said private e-mail address;
   receiving a response from said private e-mail address indicating that said e-mail message is a forgery; and
   not delivering said e-mail message to a recipient e-mail address of a recipient within said enterprise.

2. A method as recited in claim 1 further comprising:
   sending said sender e-mail address to said database and determining that said sender e-mail address is present within said database.

3. A method as recited in claim 1 further comprising:
   detecting said anomaly using text matching of words in said e-mail message.

4. A method as recited in claim 1 further comprising:
   detecting said anomaly by determining that a location of a computer used to send said e-mail message is abnormal.

5. A method as recited in claim 1 further comprising:
   detecting said anomaly by determining that a time when said e-mail message is sent is abnormal.

6. A method as recited in claim 1 further comprising:
   detecting said anomaly by determining a number of attachments to said e-mail message.

7. A method as recited in claim 1 wherein said private e-mail address is only used to receive e-mail messages from said e-mail gateway and to send e-mail messages to said e-mail gateway.

8. A method of detecting a forged e-mail message, said method comprising:
   receiving, at an e-mail gateway within an enterprise before being sent over the Internet, an e-mail message from a sender e-mail account having a sender e-mail address within said enterprise, said sender e-mail account belonging to an individual;
   detecting that said e-mail message has an anomaly indicative of fraud;
   retrieving a private e-mail address of said individual from a database using said sender e-mail address, wherein said private e-mail address is a hidden e-mail address not known to the public;
   sending said e-mail message to said private e-mail address;
   receiving a response from said private e-mail address indicating that said e-mail message is a forgery; and
   not delivering said e-mail message to a recipient e-mail address of a recipient.

9. A method as recited in claim 8 further comprising:
   sending said sender e-mail address to said database and determining that said sender e-mail address is present within said database.

10. A method as recited in claim 8 further comprising:
    detecting said anomaly by analyzing a writing style of said e-mail message.

11. A method as recited in claim 8 further comprising:
    detecting said anomaly by determining that a location of a computer used to send said e-mail message is abnormal.

12. A method as recited in claim 8 further comprising:
    detecting said anomaly by determining that a time when said e-mail message is sent is abnormal.

13. A method as recited in claim 8 further comprising:
    sending to said private e-mail address, along with said e-mail message, a first selection to release said e-mail message from quarantine and deliver said e-mail message and a second selection to not deliver said e-mail message.

14. A method as recited in claim 8 wherein the private e-mail account of said private e-mail address has no received messages other than e-mail messages received from said e-mail gateway and has no sent e-mail messages other than e-mail messages sent to said e-mail gateway.

15. A method of detecting a forged e-mail message, said method comprising:
   receiving, at an e-mail gateway within a cloud service, an e-mail message from a sender e-mail account having a sender e-mail address, said sender e-mail account belonging to an individual;
   detecting that said e-mail message has an anomaly indicative of fraud;
   retrieving a private e-mail address of said individual from a database using said sender e-mail address, wherein said private e-mail address is a hidden e-mail address not known to the public;
   sending said e-mail message to said private e-mail address;
   receiving a response from said private e-mail address indicating that said e-mail message is a forgery; and
   not delivering said e-mail message to a recipient e-mail address of said e-mail message.

16. A method as recited in claim 15 further comprising:
   sending said sender e-mail address to said database and determining that said sender e-mail address is present within said database.

17. A method as recited in claim 15 wherein said e-mail message has not been sent by said individual.

18. A method as recited in claim 15 further comprising:
   placing said e-mail message in quarantine after said detecting.

19. A method as recited in claim 15 wherein said sending to said private e-mail address includes a first selection to release said e-mail message from quarantine and deliver said e-mail message to said recipient e-mail address, said method further comprising:
   receiving a response from said private e-mail address indicating that said e-mail message is legitimate; and
   delivering said e-mail message to said recipient e-mail address of said e-mail message.

20. A method as recited in claim 15 wherein said private e-mail address is only used to receive e-mail messages from said e-mail gateway and to send e-mail messages to said e-mail gateway.

* * * * *